(12) United States Patent
Grubsky et al.

(10) Patent No.: US 7,110,644 B2
(45) Date of Patent: Sep. 19, 2006

(54) MODE COUPLING DEVICES WITH COMPLEX SPECTRAL PROFILE

(75) Inventors: Victor E. Grubsky, Los Angeles, CA (US); Dmitry S. Starodubov, Los Angeles, CA (US)

(73) Assignee: Sabeus, Inc., Calabasas, CA (US)

( * ) Notice: Subject to any disclaimer, the term of this patent is extended or adjusted under 35 U.S.C. 154(b) by 0 days.

(21) Appl. No.: 11/097,478

(22) Filed: Apr. 1, 2005

(65) Prior Publication Data

US 2005/0191007 A1 Sep. 1, 2005

Related U.S. Application Data

(62) Division of application No. 09/823,435, filed on Mar. 29, 2001.

(51) Int. Cl.
G02B 6/34 (2006.01)
(52) U.S. Cl. ....................................................... 385/37
(58) Field of Classification Search ................... 385/37
See application file for complete search history.

(56) References Cited

U.S. PATENT DOCUMENTS

| 5,104,209 | A | | 4/1992 | Hill et al. |
| 5,216,739 | A | | 6/1993 | Hill et al. |
| 5,430,817 | A | | 7/1995 | Vengsarkar |
| 5,830,622 | A | | 11/1998 | Canning et al. |
| 6,058,226 | A | * | 5/2000 | Starodubov .................. 385/12 |
| 6,839,491 | B1 | | 1/2005 | Painter |

FOREIGN PATENT DOCUMENTS

| JP | 01319259 | 12/1998 |
| WO | WO 99/45418 | 9/1999 |

OTHER PUBLICATIONS

Greene et al. ("Tailoring long period optical fibre gratings for flattening EDFA gain spectra", Electronics Letters, Aug. 5, 1999, vol. 35, No. 16, pp. 1373-1374).*
Jingren et al. ("Phase-Shifted Long-Period Fiber Gratings: A Numerical Investigation", 1999 International Conference on Computational Electromagnetics and Its Applications, 1999, Proceedings. (ICCEA '99), pp. 341-344).*
Qian et al. ("Gain flattening fibre filters using phase-shifted long period fibre gratings", Electronics Letters, May 28, 1998, vol. 34, No. 11, pp. 1132-1133).*
Ke et al. ("Analysis of Phase-Shifted Long-Period Fiber Gratings", IEEE Photonics Technology Letters, vol. 10, No. 11, Nov. 1998, pp. 1596-1598).*
Liu et al. ("Theoretical and Experimental Realisation of Composite Long-Period Fiber Grating Devices", The Institution of Electrical Engineers, 1999, Savoy Place, London WC2R OBL, UK, pp. 4/1-4/4.).*

(Continued)

*Primary Examiner*—Michelle Connelly-Cushwa
(74) *Attorney, Agent, or Firm*—Fulwider Patton LLP

(57) ABSTRACT

A mode coupling device is provided for coupling co-propagating modes in an optical waveguide to provide a gain flattening filter for use with an optical amplifier such as an erbium-doped fiber amplifier. The mode coupling device includes a plurality of long period grating sections having equal spatial periods, with adjacent grating sections separated by an interval of less than 10 periods in length. Also provided is a method for manufacturing the mode coupling device, including a method for determining the parameters of the device and a method for fine tuning the device to provide a loss spectrum closely matching the output spectrum of the optical amplifier. The mode coupling device is useful for flattening the gain of the optical amplifier.

5 Claims, 9 Drawing Sheets

OTHER PUBLICATIONS

Lee et al. ("Dependence of fringe spacing on the grating separation in a long-period fiber grating pair", Applied Optics, Jun. 1, 1999, vol. 38, No. 16, pp. 3450-3459.).*

Ramachandran et al., "Effects of chirp in long period gratings," pp. 286/SaC3-1-288/SaC3-3.

Vengsarkar et al., "Long-period fiber-grating-based gain equalizers," Optics Letters, vol. 21, No. 5, Mar. 1, 1996, pp. 336-338.

Greene et al., "Tailoring long period optical fibre gratings for flattening EDFA gain spectra," Electronics Letters, 5th Aug. 1999, vol. 35, No. 16, pp. 1373-1374.

Harumoto et al., "Compact long-period grating module with multi-attenuation peaks," Electronics Letters, 16th Mar. 2000, vol. 36, No. 6, pp. 512-514.

Qian et al., "Gain flattening fibre filters using phase-shifted long period fibre gratings," Electronics Letters, 28th May 1998, vol. 34, No. 11, pp. 1132-1133.

Vasiliev et al., "Long-period refractive index fiber gratings: properties, applications, and fabrication techniques," In *Advances in Fiber Optics*, Eugony M. Dianov, Editor, Proceedings of SPIE vol. 4083 (2000), pp. 212-223.

Bae et al., "Design Methods of Long Period Fiber Gratings for the Equalization of nonflat Erbium Gain Spectrum," Scientific Computing Lab., Dept. of Electrical Engineering & Computer Science, Korea Advanced Institute of Science and Technology, Nov. 6, 2000, pp. 1-13.

Byeong, Ha Lee et al.: "Dependence of Fringe Spacing on the Grating Separation in a Long-Period Fiber Grating Pair," Applied Optics, Optical Society of America, Wshington, US, vol. 38, No. 16, Jun. 1, 1999, pp. 3450-3459, XP002934967, ISSN: 0003-6935.

* cited by examiner

MODE COUPLING DEVICES WITH COMPLEX SPECTRAL PROFILE

This application is a division of U.S. application Ser. No. 09/823,435, filed Mar. 29, 2001.

FIELD OF THE INVENTION

The invention relates to optical systems and devices and, in particular to optical systems and devices employing long period gratings providing spectral filtering.

BACKGROUND OF THE INVENTION

Optical fibers are capable of transmitting an optical signal containing a large amount of information over long distances with very low loss. An optical fiber is a small diameter waveguide characterized by a core with a first index of refraction surrounded by a cladding having a second (lower) index of refraction. Light rays which impinge upon the core at an angle less than a critical acceptance angle undergo total internal reflection within the fiber core. These rays are guided along the axis of the fiber with minimum attenuation. Typical optical fibers are made of high purity silica with minor concentration of dopants to control the index of refraction.

Although optical fiber is capable of transmitting optical signals over long distances with very low loss, the size and complexity of modem telecommunication network necessitates amplification of the signal within the fiber to maintain signal accuracy and transmission efficiency. In a typical telecommunications network, light of approximately 1550 nanometers (nm) is transmitted along the guided wave portion of a waveguide, typically an optical fiber.

Due to attenuation of the light signal along the length of the optical fiber, it is necessary to reinforce or amplify this signal at given intervals along the fiber. Optical fiber amplifiers such as erbium-doped fiber amplifiers are used to intensify the optical signal that is attenuated along the fiber optic communication path. These optical fiber amplifiers have replaced cumbersome electrical repeaters in fiber optic communication links.

In a typical case, a section of an optical fiber is doped with ions of rare-earth elements such as, for example, erbium. The energy structure of the erbium ion is such that the signal light with wavelength of approximately 1530–1565 nm can be amplified in the fiber if the fiber is pumped by a suitable light source. In such a circumstance, light within the same bandwidth entering the optical fiber will experience a net gain, and will exit the fiber with greater power. One problem limiting the capacity of such systems is that the erbium-doped fiber amplifier has a characteristic spectral dependence providing different gains for different wavelengths. This spectral dependence poses a problem for multi-channel wavelength division multiplexed systems because different gains for different channels would lead to high bit error rates in some of the channels.

Typically, as illustrated by the graph depicted in FIG. 1, an erbium-doped fiber amplifier gain spectrum has a primary gain peak between 1531 and 1532 nanometers, a subsidiary maximum near 1546 and 1556 nm, and minima around 1538 and 1551 nm. To achieve the flat gain spectrum required for broadband optical fiber communications, the erbium-doped fiber amplifier can be combined with a component that has a loss spectrum shaped to compensate for the wavelength dependence of the amplifier gain. Ideally, a gain flattening component should allow matching at any time to any amplifier gain spectrum.

One approach to this problem has been to incorporate various spectral shaping devices into the optical fiber to help flatten the gain spectrum of the erbium-doped fiber amplifier. In one approach, a series of uniform long period gratings were formed in an optical fiber. Each of the gratings removed certain spectral components of the gain spectrum of the erbium-doped fiber amplifier. Unfortunately, flattening the gain spectrum of an erbium amplifier in this manner results in a relatively long optical device, on the order of several decimeters, which is difficult to manufacture and package.

In general, there are two basic ways to flatten a gain spectrum of a fiber amplifier: one way is to tailor the material properties of the erbium-doped fiber, and the other is to use filters designed to approximate the inverse characteristics of the gain spectrum of the fiber amplifier. Because a gain flattening filter requires transmission characteristics of very low back reflection and wide band width, long period grating are particularly useful.

As is well known in the art, gratings are formed using grooves or other artifices to refract light incident upon the grating. These grooves or other artifices are arranged in a repeating pattern that is characterized by a spatial period. In its broadest aspect, a fiber grating is composed of alternating regions having differing indices of refraction.

Long period gratings couple the fundamental mode of transmission of light through the fiber with cladding modes, propagating in the same direction. This is fundamentally different from Bragg fiber gratings, where the fundamental mode is coupled to modes with the opposite direction of propagation. Because the long period grating does not produce reflected light, unlike a Bragg grating, the long period grating is especially well suited as a spectrally selective attenuator.

Typically, the excited cladding mode coupled by the long period grating dissipates in the coated fiber part of the grating, which results in a resonance loss in the transmission spectrum of light passing through the grating region. Normally, over a given spectral range, the spectrum of a long period grating has only one pronounced resonance, and although changing the parameters of the grating can tailor the shape of the loss spectrum, such a grating may be used only to flatten the peak at a single wavelength of the amplifier. Thus, to flatten all the peaks in an output spectrum of a fiber amplifier, a series of long period gratings must be chained together, or the period or refractive index modulation along the grating may be varied in a single grating.

For example, in one method, a single long period grating was manufactured by introducing a phase shift by adding a length of unperturbed region in the middle of the long period grating to produce a resonance loss spectrum having two peaks. In other words, rather than having a grating where the perturbed and unperturbed regions are all the same size, at some point in the middle of the grating, the unperturbed region was longer. Alternatively, the grating may be chirped using methods well known to those skilled in the art. The disadvantage of this method, however, is that such gratings are difficult to manufacture, and efficient matching of complex spectra may not be possible.

In another approach, long period gratings may be chained together. One way to manufacture a gain flattening filter is to combine a series of long period gratings having different fundamental periods. However, the loss spectrum of each long period grating in the series may contain supplementary features, resulting in unwanted phase shift effects within the transmitted modes. These phase shifts can alter the transmission spectrum of the gain flattening filter and degrade its efficiency.

In still another approach, three short grating sections, comprising five-fifteen periods in length, were separated by long sections of fiber on the order of sixty periods. While such an arrangement can be used to flatten the gain of an optical amplifier, the resulting structure is long and requires strong modulation of the fiber's refractive index, on the order of greater than $10^{-3}$, to achieve the desired effect.

Yet another approach to flattening the gain of an optical amplifier has been to provide a coupler with a grating having a spatially varying period. However, it is difficult to control the shape of the resulting spectrum. A modification of this approach has been suggested by combining several grating sections having the same period, but each having a different effective refractive index. However, this design is impractical to manufacture because it is difficult to control the effective indices with sufficient precision. Manufacturing a filter using grating sections having the same index, but different spatial periods, is also difficult.

One problem with each of the approaches as described above is that they all use a long period grating to couple light from core of the optical fiber into a lossy mode in the cladding. This results in loss of the coupled mode into the coating of the fiber. What has been needed, and heretofore unavailable, is a mode coupling device capable of coupling between guided core mode and guided cladding modes so that the two modes co-propagate. Such a device will have a complicated spectral profile that may be employed to flatten the gain of a erbium-doped fiber amplifier. Additionally, the device should be easy to manufacture, easy to anneal, and suitable for a relatively small package compatible with commercial erbium-doped fiber amplifiers. The present invention fills these and other needs.

SUMMARY OF THE INVENTION

The present invention provides a mode coupling device for use in telecommunication networks to flatten the gain of optical amplifiers used in an optical network. More specifically, the present invention provides a gain flattening filter including a plurality of long period gratings formed in the core of an optical fiber to shift light of unwanted wavelengths from a guided core mode into a guided cladding mode. Such a device is particularly useful in flattening the gain of a fiber optic amplifier, such as an erbium-doped fiber amplifier, to ensure that signals of different wavelengths transmitted in the optical fiber have the same power.

In one aspect of the present invention, the gain flattening filter includes a plurality of long period gratings having the same number of periods and refractive strength separated from each other by intervals having a length of less than 10 periods formed in the core of an optical fiber. Such a gain flattening filter has been shown to match a target spectrum within 0.5 dB, and is useful for flattening the spectral response of an erbium amplifier.

In another aspect of the present invention, the gain flattening filter includes a plurality of long period gratings having the same spatial period and separated from each other by intervals having a length of less than 10 periods formed in the core of an optical fiber. One or more of the intervals may be further processed to adjust the optical length in order to more closely match a target spectrum. Gain flattening filters including such further processed intervals have been shown to match a target spectrum within 0.05 dB.

In a further aspect of the invention, a method of determining one or more parameters necessary for manufacturing a gain flattening filter according to the present invention is provided. Using this method, parameters used during manufacturing of the gratings in the filter are determined by starting with an initial set of parameters, and then, using a computer program, calculating an expected loss spectrum for the set of parameters, adjusting the parameters, and calculating another expected loss spectrum until analysis of the loss spectrum indicates that the parameters will produce a gain flattening filter having a spectrum that closely matches a target spectrum.

Yet another aspect of the invention provides a method for fine tuning the spectrum of the gain flattening filter of the present invention. The method includes analyzing the spectrum of a gain flattening filter manufactured in accordance with the method described previously and determining an additional set of parameters to be used during further processing to alter the optical length of one or more intervals separating the gratings formed in the core of the optical fiber. The selected intervals are further processed by exposing the selected intervals to ultraviolet light to alter the optical length of the interval by changing the refractive index of the portion of the core of the fiber where the interval is located. Additionally, the spectrum of the gain flattening filter may be monitored while the selected interval or intervals is being exposed to the ultraviolet light to determine when the optical length of the interval has been sufficiently altered to adjust the phase shift of the filter to match the target spectrum.

Alternatively the perturbed regions of the grating and the regions between the gratings could be processed with other sources capable of changing the refractive index of glass, for example such as $CO_2$ laser, femtosecond laser or arc discharge.

Other features and advantages of the present invention will become more apparent from the following detailed description, taken in conjunction with accompanying drawings, which illustrate, by way of example, the principles of the invention.

DETAILED DESCRIPTION OF THE PREFERRED EMBODIMENTS

The present invention provides a system and method for forming a gain flattening filter in an optical fiber. Also provided is a method for analyzing the transmission spectrum specified to flatten the gain of a particular amplifier to determine key parameters of the desired filter such as number of gratings required, spacing of the grating sections, period of each grating and the strength of the gratings as well as a method for forming and fine tuning the gratings of the present invention to provide the desired filter characteristics.

In the following detailed description numerous specific details are set forth in order to provide a more thorough understanding of the present invention. However, it will be apparent to those skilled in the art to which this invention pertains that the present invention may be practiced without these specific details. In other instances, well-known devices, methods, procedures, and individual components have not be described in detail so as not to obscure aspects of the present invention.

Figure 1:
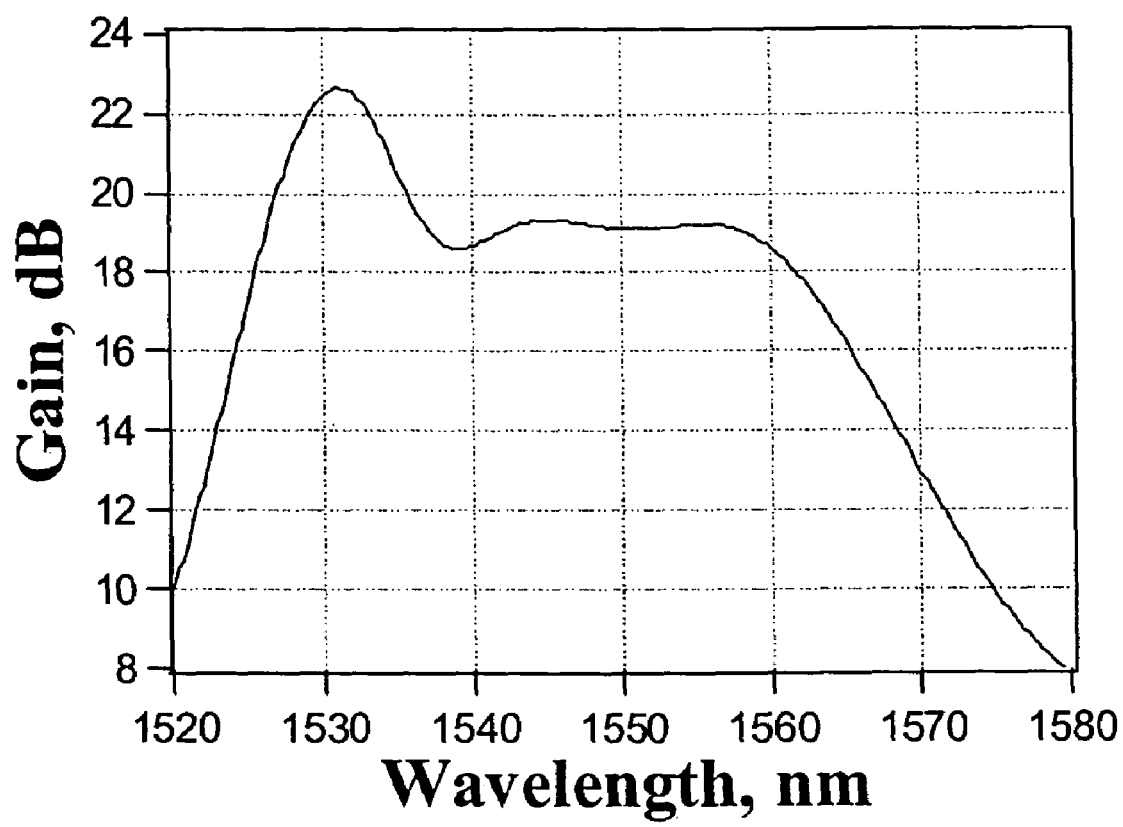
FIG. 1 shows the characteristic gain versus wavelength spectrum of a typical erbium-doped fiber amplifier.

FIG. 1 shows the characteristic gain spectrum of an erbium-doped optical fiber amplifier. As can be seen, the amplifier has a pair of gain peaks at about 1530 nm and at about 1560 nm. Because of this, a signal having a wavelength at 1530 nm will be amplified more than a signal having a wavelength of 1540 nm, which would be disadvantageous in many telecommunication systems utilizing wavelength division multiplexing.

Figure 2:
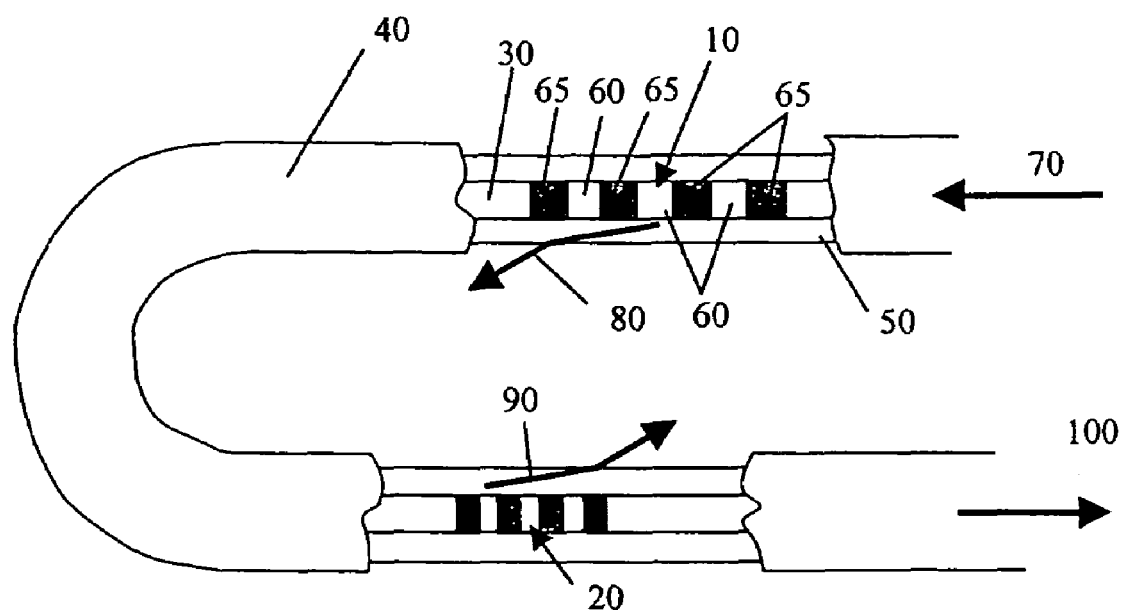
FIG. 2 depicts the design a prior art gain flattening filter in which a series of long period gratings couple light into lossy cladding modes.

FIG. 2 depicts a prior art design of a gain flattening filter formed in an optical fiber. In this prior art example, the gain flattening filter is composed of a series of long-period gratings 10, 20 formed in the core 30 of optical fiber 40. Optical fiber 40 also includes a cladding layer 50 that surrounds the core 30. As depicted in the FIG. 2, long period gratings 10, 20 have different spatial periods, with each period composed of an unperturbed region 60 and perturbed region 65. While only two long period gratings 10, 20 are shown in FIG. 2, those skilled in the art will be aware that additional gratings could be included in such a device, dependent upon the transmission spectrum desired.

In this prior art device, light 70 exiting an optical amplifier having a spectrum such as that illustrated in FIG. 1 is transmitted through fiber 40 and encounters long period grating 10. Long period grating 10 couples a portion of the light 70 into a lossy cladding mode which results in dispersion of light 80 into the cladding 50 of fiber 40 and ultimately exiting fiber 40. The wavelength of light coupled into the lossy cladding mode is dependent on the period and strength of the gratings. The wavelengths of light 70 that are not coupled into the lossy cladding mode continue along fiber 40 until they encounter grating 20. At grating 20 an additional portion of light 70, dependent on the characteristics of grating 20, is coupled into lossy cladding mode 90. Thus, the overall loss spectrum (dB) of the light 100, which may be considered the output signal of the prior art gain flattening filter depicted in FIG. 2, is the sum of the accumulated losses from gratings 10, 20. While such a design may provide adequate filtering of the light signal transmitted through optical fiber 40 to flatten the transmission spectrum of the light in the case of a relatively simple spectrum, the main draw back of this design is that many gratings are required to fit a complex loss spectrum, making the device too long and too difficult to manufacture and package.

Figure 3:
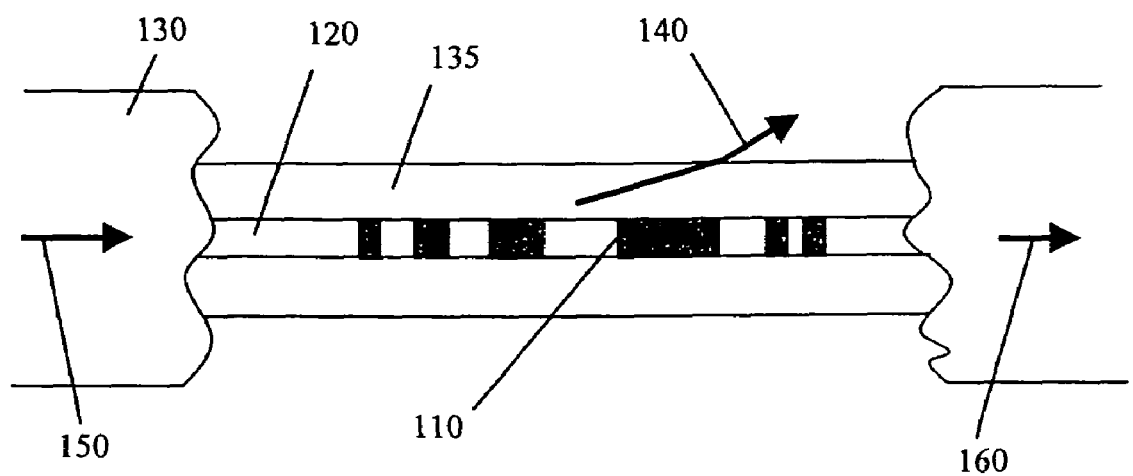
FIG. 3 depicts a long period grating in the prior art with variable periods and/or index along the grating to achieve a complex spectrum.

FIG. 3 illustrates another example from the prior art depicting a long period fiber grating whose parameters vary along the length of the fiber. In this example, grating 110 is formed in the core 120 of optical fiber 130. As before, cladding layer 135 surrounds the core 120 of optical fiber 130. Grating 110 may be formed in the core 120 to have a continuous change of period along the grating. Alternatively, the grating may be formed in core 120 having multiple sections, each section having a different period or different refractive index. In this example, a light signal 150 having an undesirable spectrum encounters grating 110. Depending on the design of grating 110, specific wavelengths of light signal 150 are coupled into a lossy cladding mode 140, which ultimately exits the fiber and is lost. Gratings such as depicted in FIG. 2, having varying period or index of refraction are difficult to manufacture. It is also difficult to design a grating having a varying period to have a desired spectral shape and such gratings may not be able to be formed for certain complicated spectrums.

Figure 4:
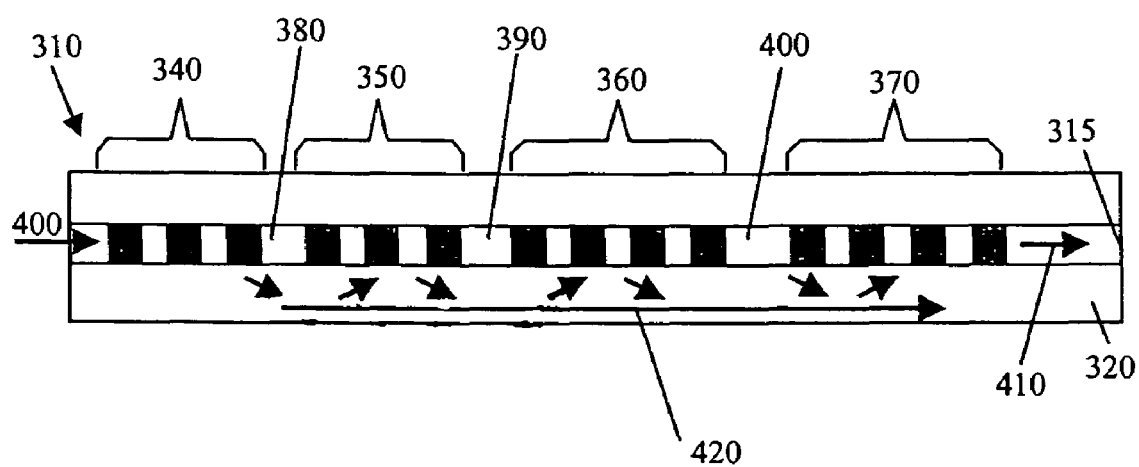
FIG. 4 depicts a filter of the present invention comprising several gratings that couple light from the core to the cladding and back.

Referring now to FIG. 4, a gain flattening filter formed in accordance with the present invention is illustrated. FIG. 4 depicts a section of optical fiber 310 having a core portion 315 surrounded by a cladding layer 320. A series of long period gratings 340, 350, 360, and 370 are formed in the core portion 315 of optical fiber 310. While the refractive index modulation and the average refractive index are preferably the same for all of the gratings in the series, each grating section may have a different length, that is, a different number of perturbed and unperturbed regions. Gratings 340, 350, 360, and 370 are separated by intervals 380, 390, and 400 in the core portion. Intervals 380, 390, and 400 are typically between 0.1–10 grating periods in width, and preferably, the optimum optical length of the intervals range from 1 and 2 grating periods in width. It is well known in the art that the optical length of a medium depends not only on the physical length of the medium, but is also a function of the index of refraction of the medium. As will be discussed in more detail below, the precise optical length of each interval between the gratings comprising the gain flattening filter of the present invention may be tuned to optimize the transmission spectrum of the gain flattening filter.

Central to the mode of operation of the gain flattening filter of the present invention is utilization of gratings, that due to the design of the gratings, couples a light signal 400 encountering the gain flattening filter of the present invention from the guided core mode to a guided cladding mode such that both core and guided cladding modes are co-propagating. For example, grating 340 couples light from the core mode 400 of the fiber into guided cladding mode 420. Each subsequent grating, couples light from the guided cladding mode 420 back into the core mode 410 or from the core mode 410 into the guided cladding mode 420. This mode of operation differs substantially from that described with reference to the prior art in that the fundamental mode of light transmitted through the core is coupled into a guided cladding mode of the fiber rather than into a lossy mode.

The number of periods of each grating and the optical length of the region separating adjacent gratings determines the spectrum of light that exits the filter. A principle advantage of this design is that, in practice, it is relatively straight forward to fabricate using grating methods well known by those skilled in the art. Alternatively, the fiber grating sections of the present invention can be formed in an optical waveguide and coupled between the guiding channel and the surrounding medium of the waveguide, so long as the transmission of a signal through the filter results in co-propagation of the signal in the guiding channel and surrounding media.

A particularly advantageous aspect of the present invention is that the gain flattening filter can be fine tuned to match the filter's loss spectrum to the transmission spectrum of an optical amplifier, even when the spectrum of the amplifier is complex. In accordance with the present invention, this fine tuning is accomplished by adjusting the optical length of the regions between adjacent grating to adjust the spectrum of the grating to match the output spectrum of the amplifier. Using the methods of the present invention is has been possible to match spectrums to within 0.05 dB, which is difficult, if not impossible, to achieve with prior art long period grating gain flattening filters.

Figure 5:
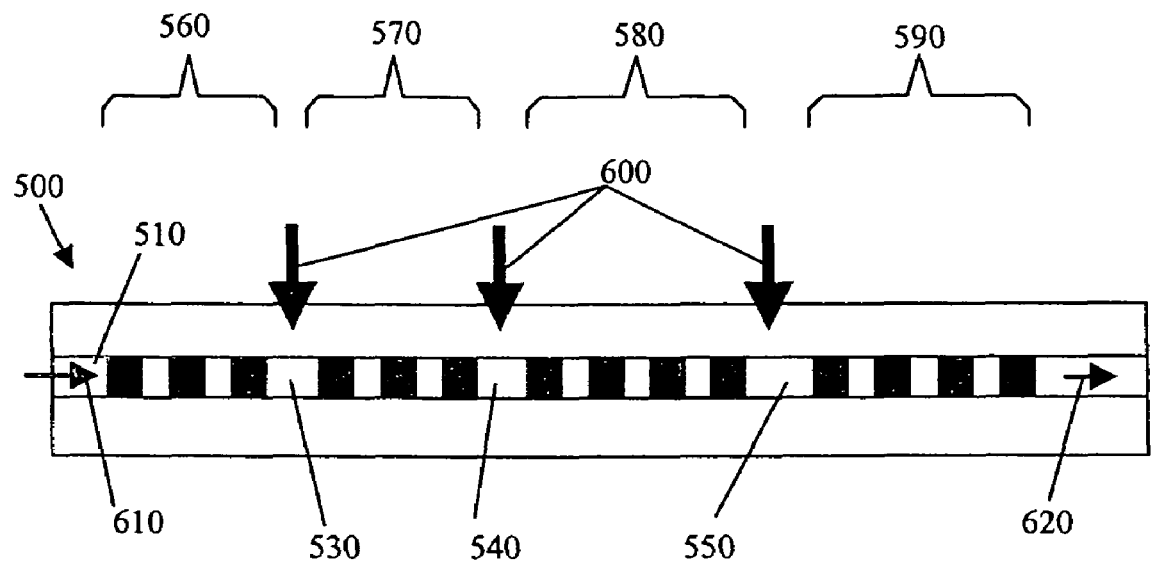
FIG. 5 illustrates how a filter can be fine tuned by exposing the filter with UV light.

FIG. 5 illustrates how one or more of intervals 530, 540, and 550 of a gain flattening filter formed in the core 510 of optical fiber 500 can be adjusted to fine tune the transmission spectrum of the filter. The transmission spectrum of the filter is fine tuned by exposing one or more of intervals 530, 540, and 550 to ultraviolet light 600 of an appropriate wavelength for a period of time sufficient to alter the refractive index of the photosensitive core 510 of fiber 500 in the location of the selected intervals 530, 540 and 550, therefore altering the optical length of these intervals. By properly adjusting the fluence of the ultraviolet light delivered to each interval, the individual intervals 530, 540, and 550 may be adjusted to optimize the filter spectrum to match the output spectrum of an optical amplifier.

Referring again to FIG. 5, gratings 560, 570, 580, and 590 may be manufactured using methods that are well-known by those skilled in the art to form long period gratings within the core 510 of optical fiber 500. Prior art devices incorporating long period gratings in the core of an optical fiber have typically been formed using a mask that is positioned between the optical fiber and an ultraviolet light source. The photosensitive core of the fiber is thus exposed through the cladding or other protective layer of the fiber to light transmitted through the mask to form the grating. Using this manufacturing process, however, it is difficult to form long period gratings with the accuracy required to closely match the desired loss spectrum of the grating to the output spectrum of an optical amplifier.

In the present invention, long period gratings are formed one stripe, or perturbed region, at a time, using a process known in the art as the step-by-step technique. In this method, an optical fiber is mounted in a suitable fixture to hold the fiber. Typically, the mounted fiber is then mechanically translated relative to a focused laser beam to form each perturbed region. Using a laser of the appropriate wavelength, a section of the optical fiber is illuminated with ultraviolet light for a predetermined amount of time sufficient to change the refractive index of the region of the core to achieve a grating having a desired refractive index profile. A suitable laser would be a CW frequency doubled argon-ion laser. Alternatively the stripes of the grating having a relatively higher refractive index and the regions between the gratings having a relatively lower refractive index could be processed with other sources capable of changing the refractive index of glass, for example such as a CO2 laser, femtosecond laser or arc discharge.

The present invention incorporates a method for determining the parameters of the various gratings to be incorporated into the gain flattening filter. In accordance with the present invention, the procedure for determining the parameters of the gain flattening filter of the present invention necessary to fit the loss spectrum of the filter to the transmission spectrum of a specific optical laser amplifier is set forth in FIG. 6. In box 700, the loss spectrum of the filter required to flatten the gain of a particular optical amplifier is determined from the output spectrum of the amplifier. Typically, the output spectrum of the amplifier will be provided as a plot showing the gain of the amplifier at many different wavelengths, such as that illustrated in FIG. 1 for an erbium-doped fiber amplifier. It will be understood by those skilled in the art that the output spectrum of other types of amplifiers, for example, such as Raman amplifiers, semiconductor amplifiers and rare-earth doped fiber amplifiers, even though they may have spectral gain and operation wavelengths different from erbium-doped laser amplifiers, may also be flattened using the gain flattening filter of the present invention.

Referring again to FIG. 6, data representing the output spectrum of the laser amplifier to be flattened may be loaded into a computer program embodying the fitting method of the present invention. Once the spectrum to be matched is loaded, an initial set of filter parameters that will provide a filter having the desired loss spectrum are entered into the fitting program in box 710.

The initial filter parameters generated in box 710 are then analyzed using algorithms embodying the calculations set forth below to determine whether the spectrum of a filter incorporating such parameters will match the output spectrum of the fiber amplifier, as shown in box 720. The program, in box 730, then determines whether deviations between the loss spectrum of the filter and the output spectrum of the optical amplifier are within desired limits. If the filter parameters generated in box 710 are determined to produce a loss spectrum that satisfactorily matches the output spectrum of the optical amplifier as entered in the program in box 700, then the spectrum fitting procedure is complete and a gain flattening filter may be formed in accordance with the filter parameters generated in box 710.

In the case where the variations between the filters' loss spectrum and the amplifiers output spectrum are not within desired limits, the program branches back to box 710, and may suggest adjusted parameters for the filter. Alternatively, new filter parameters may be entered by an operator. Using the adjusted or new parameters, the process then repeats until the analysis of filter deviations in box 730 indicates that the filter parameters generated in the last iteration of the process provide a gain flattening filter having a calculated loss spectrum that satisfactorily matches the specified output spectrum of the amplifier entered in box 700. It will be understood by those skilled in the art that although this description identifies the spectrum entered in box 700 as the "output spectrum of the optical amplifier", the term is interchangeable with the term "specified filter transmission" used in box 700 in FIG. 6. The loss spectrum of the filter is the inverse of the transmission spectrum of the filter.

Figure 6:
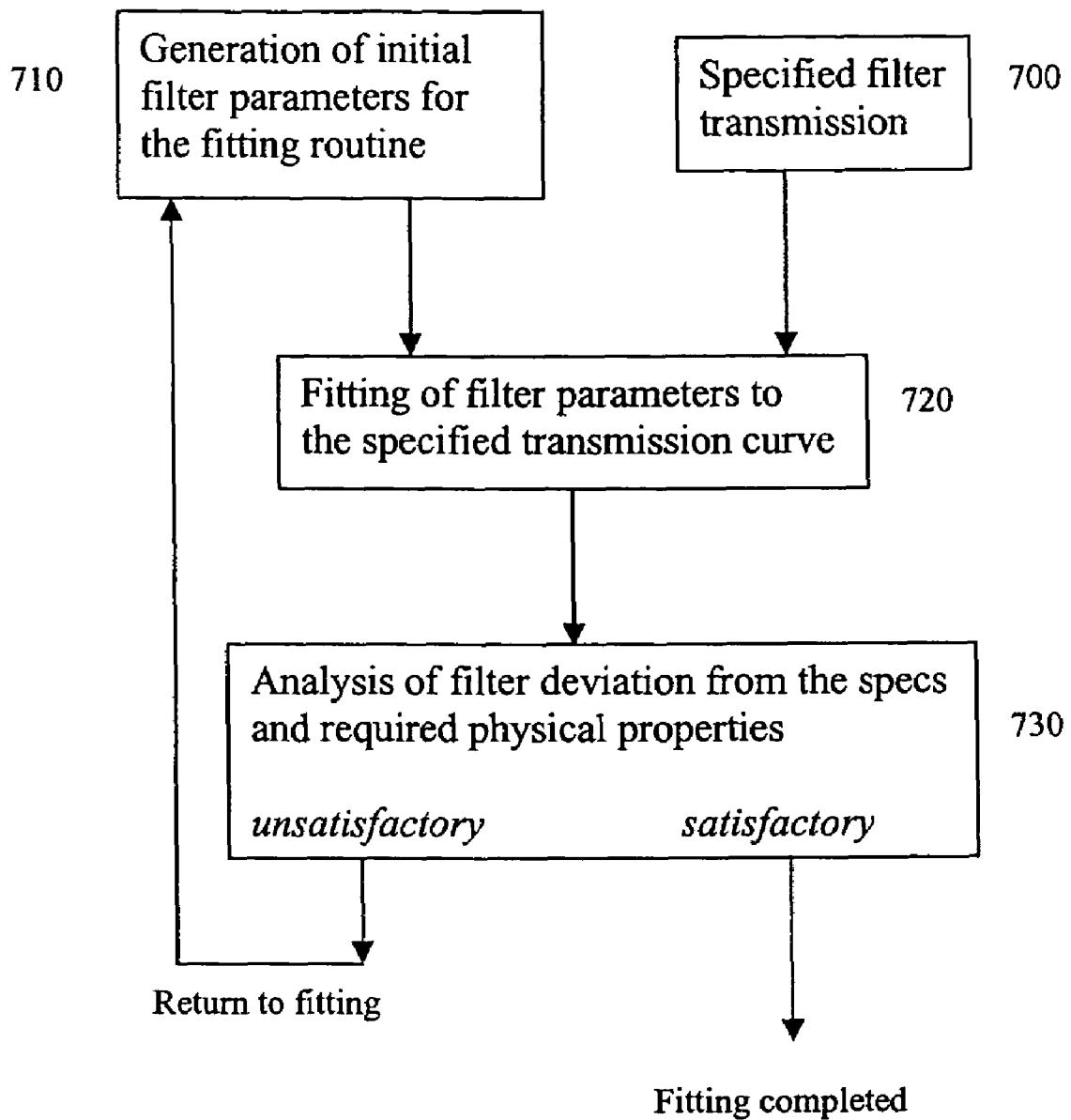
FIG. 6 is a block diagram illustrating a method for determining the parameters of a gain flattening filter according to the present invention.

The processes set forth in FIG. 6 are generally carried out using a computer operating software that has been specifically programmed to carry out the desired calculations. Alternatively, of course, the same calculations may be performed by hand, although they are tedious and time consuming. While various methods for calculating the loss or transmission spectrums of gain flattening filters from known parameters of the filter may be used, an embodiment of the present invention incorporates the following calculations which have been is shown to provide filter parameters that may be used to accurately manufacture devices embodying the present invention.

The spectrum of a uniform grating with length L and constant period $\Lambda$ can be calculated using the coupled mode theory. Assuming $X_{in}$ and $Y_{in}$ are the amplitudes of the core and cladding modes at the input, the output amplitudes $X_{out}$ and $Y_{out}$ are given by:

$$X_{out}=[\cos(\beta L)-i\gamma/(2\beta)]^* \sin(\beta L)]^* X_{in}+id/(2\beta)^* \sin(\beta L)^* Y_{in}$$

$$Y_{out}=id/(2\beta)^* \sin(\beta L)^* X_{in}+[\cos(\beta L)-i\gamma/(2\beta)]^* \sin(\beta L)]^* Y_{in},$$

where d=coupling coefficient, $\gamma=2\pi/\Lambda-(k_x-k_y)$—detuning of core and cladding wavevectors from the resonance, and $\beta=(\gamma+d)^{1/2}/2$.

Detuning parameter $\gamma$ can be approximated with a second-order polynomial function of wavelength $\lambda$:

$$\gamma=\alpha_1^*(\lambda-\lambda_0)+\alpha_2^*(\lambda-\lambda_0)^2,$$

where $\lambda_0$ is the resonance wavelength of the grating and coefficient $\alpha_1$ and $a_2$ may be found experimentally.

The transmission spectrum $T(\lambda)$ is calculated by using a unit intensity of light in the core mode and no light in the cladding mode at the input, and rejecting the cladding mode at the output:

$$X_{in}=1, Y_{in}=0$$

$$T(\lambda)=|X_{out}|^2$$

When N uniform gratings are stacked together with phase shifts $\phi_n$ between them, the calculation of the total transmission spectrum is as follows:

$$X_{in}^{(1)}=Y_{in}^{(1)}=0$$

$$X_{in}^{(2)}=X_{out}^{(1)}, Y_{in}^{(2)}=Y_{out}^{(1)}\exp(i\phi_1)$$

$$X_{in}^{(n)}=X_{out}^{(n-1)}, Y_{in}^{(n)}=Y_{out}^{(n-1)}\exp(i\phi_{n-1})$$

$$X_{in}^{(N)}=X_{out}^{(N-1)}, Y_{in}^{(N)}=Y_{out}^{(N-1)}\exp(i\phi_{N-1})$$

$$T(\lambda)=|X_{out}^{(N)}|^2$$

Figure 7:
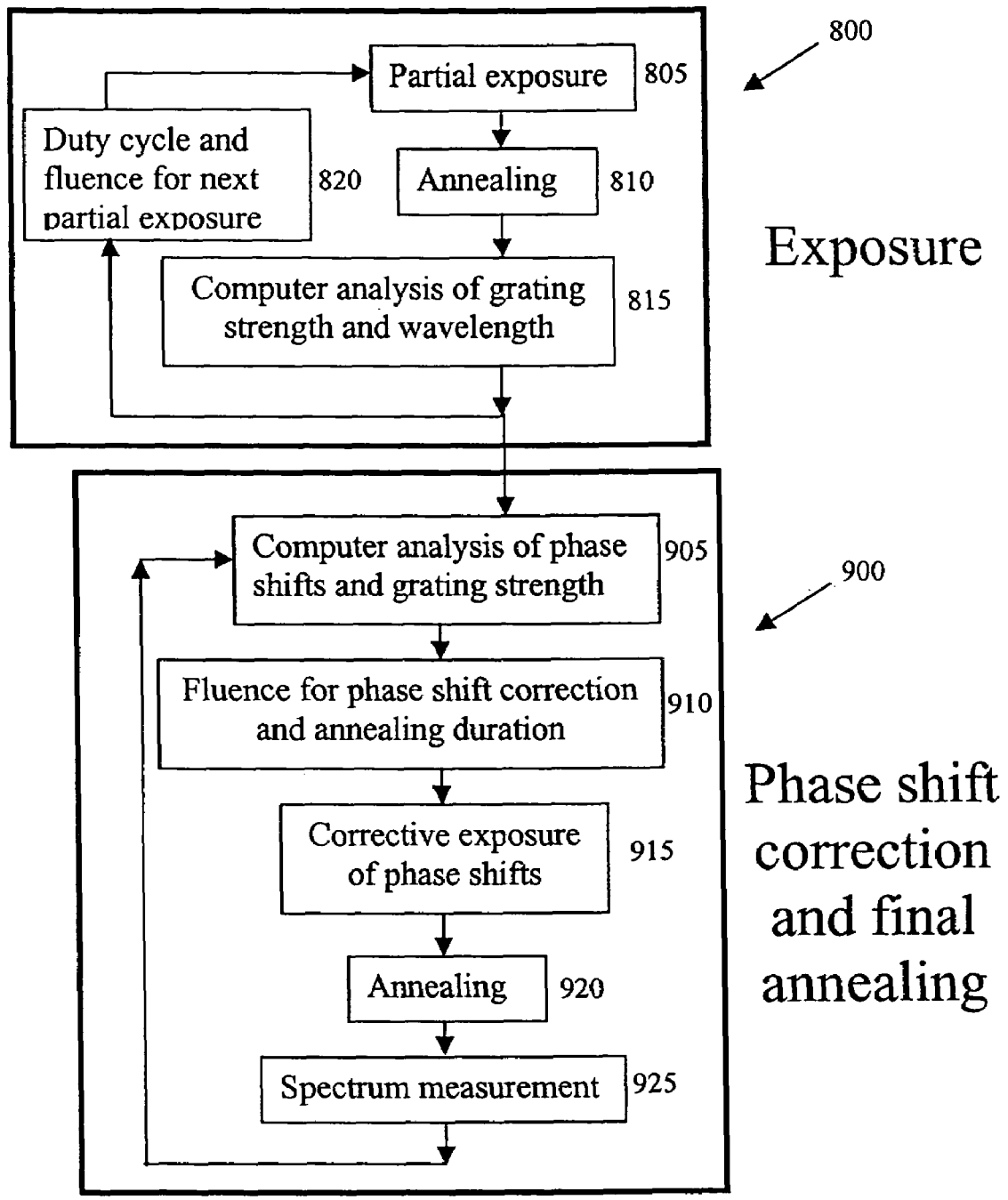
FIG. 7 is a block diagram illustrating a method of forming and fine tuning the the transmission spectra of the gain flattening filter in FIG. 6.

Referring now to FIG. 7, a method of forming and fine tuning the long period gratings of the present invention is set forth. The procedure for forming the long period gratings of the present invention is broken down into two general phases. In the first phase, as indicated by the process set forth in box 800, the long period grating of the present invention is formed in the optical fiber. Using the parameters calculated as set forth above, the optical fiber is exposed to light at an appropriate wavelength, generally ultraviolet light, in box 805. During this exposure individual perturbed areas of the optical fiber are written into the fiber in order to form the grating. Typically, this exposure is accomplished by mounting the optical fiber in a suitable fixture and mechanically translating the optical fiber relative to a finely focused laser beam of an appropriate wavelength. In this manner, the photosensitive core of the fiber may be illuminated such that the grating is formed stripe by stripe. The strength of the grating is determined by the difference in refractive index between the high and low index regions.

It has been found to be advantageous to expose the optical fiber to only a fraction of the calculated exposure necessary to form to the finished grating. This allows the grating to be annealed in step 810, followed by computer analysis of the strength and transmission spectrum of the grating. This analysis is carried out using methods well known to those skilled in the art of characterization of the optical properties of long period gratings.

Due to the inherent difficulty and inaccuracies in writing gratings using an external ultraviolet source, the computer analysis of box 815 is particularly useful in preventing wastage of optical fiber, in that it is more efficient and less costly to under shoot on the strengths of the grating at particular wavelengths so that the grating may be adjusted with further exposure to the ultraviolet light source. Accordingly, if the analysis carried out in box 815 indicates that the formed grating or gratings requires additional exposure to provide the desired transmission spectrum of the gain flattening filter, the parameters for laser duty cycle and ultraviolet light fluence required to produce a filter having the desired spectrum are calculated in box 820. After the process parameters are determined, the fiber is again illuminated by ultraviolet light as in box 805 in accordance with those process parameters. As indicated by the block diagram shown in box 800, this process is repeated until the spectrum of the grating is of the desired strength and wavelength.

Once the grating has been written into the optical fiber, the second phase of the manufacturing process may be carried out, as depicted in box 900 in FIG. 7. In this phase, the long period fiber grating gain flattening filter of the present invention is analyzed in box 905 to determine whether adjustments need to be made in the gratings of the filter to alter the strength and phase shift of each grating to ensure that the loss spectrum of the grating matches the desired output spectrum of the fiber amplifier.

In box 910, the fluence, or required illumination, of ultraviolet light necessary to adjust the intervals between the gratings to provide the desired phase shift correction, as well as the time required to anneal the grating using methods well known in the art, such as exposing the filter to heat or light or other means to provide the appropriate spectrum are determined. After the fluence and annealing duration are determined in box 910, the optical fiber is carefully illuminated with ultraviolet light in box 915 in accordance with the fluence determined in step 910 by illuminating the particular intervals between the gratings that require alteration to provide the desired phase shift.

After the appropriate intervals between grating sections have been adjusted in box 915 in accordance with the determinations carried out in box 910, the gain flattening filter of the present invention is annealed in box 920 using methods well known by those in the art. After annealing step 920 is completed, the loss spectrum of the gain flattening filter is determined in box 925. If the spectrum of the gain flattening filter meets the required specifications, then the process is completed and the gain flattening filter is ready for packaging. In the event, however, that the spectrum of the gain flattening filter does not fall within the desired specifications, further analysis of the phase shift and grating strength of the gain flattening filter may be carried out as set forth in box 905, and the process repeated until the optical characteristics of the gain flattening filter are optimized. The following examples illustrate the present invention.

EXAMPLE 1

Figure 8:
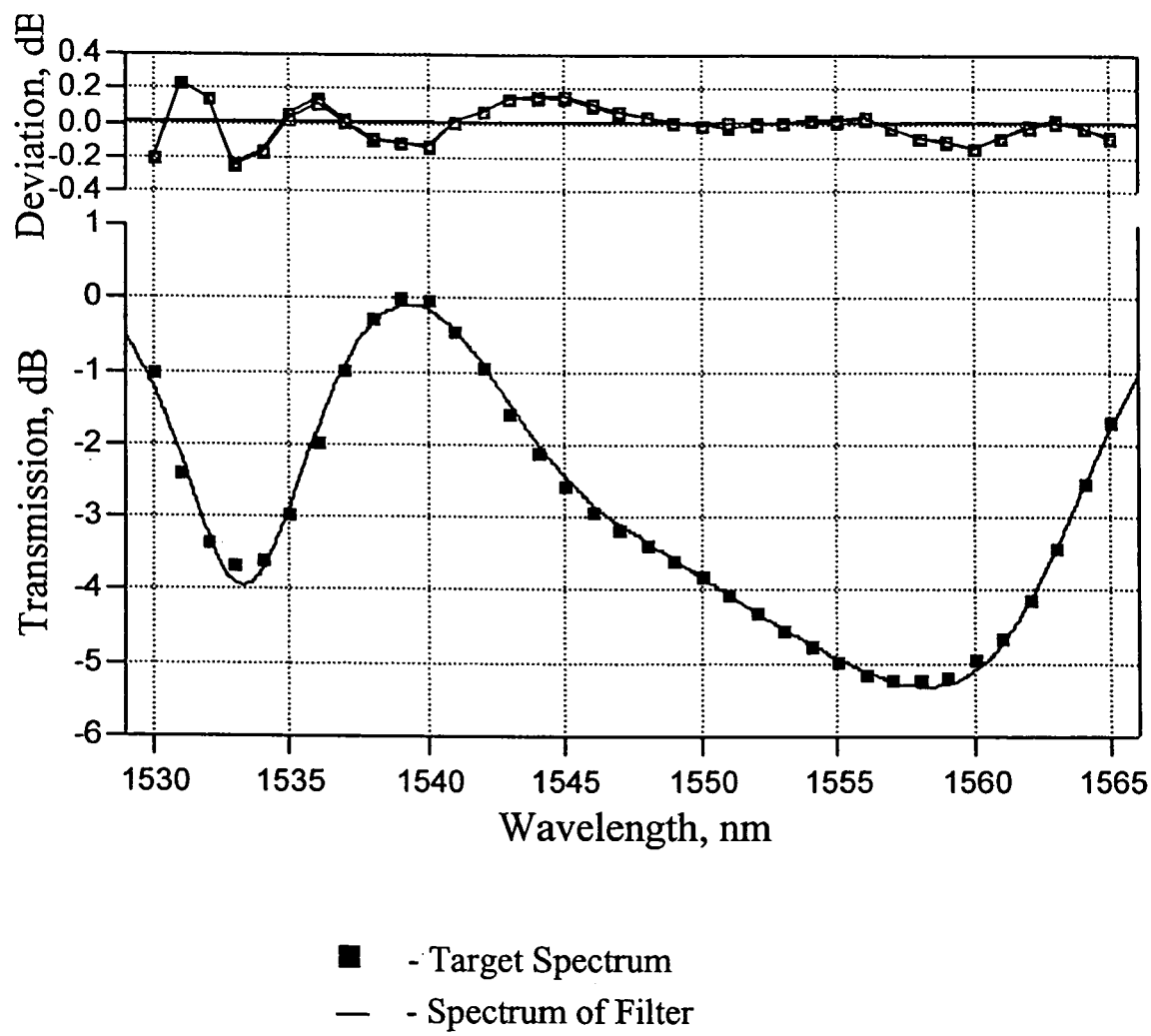
FIG. 8 is an example of the transmission spectrum of the gain flattening filter according to the present invention of FIG. 4.

An optical fiber having a photosensitive core and sized to provide single mode transmission was exposed to a square wave pattern of UV light from a CW frequency doubled argon-ion laser running at a 50 percent duty cycle. The filter consisted of four adjacent gratings sections formed in the optical fiber. Each of the grating sections had a period of 258 microns. The lengths of the four grating sections were 24, 58, 37, and 22 periods, respectively. The intervals between adjacent grating sections were 1.40, 1.13, and 1.67 periods respectively. The resulting output spectrum and target filter data for the fiber of this example is shown in FIG. 8. As can be seen from FIG. 8, the resulting spectrum of the gain flattening filter formed in the optical fiber was within plus/minus 0.2 dB of the target spectrum.

EXAMPLE 2

Figure 9:
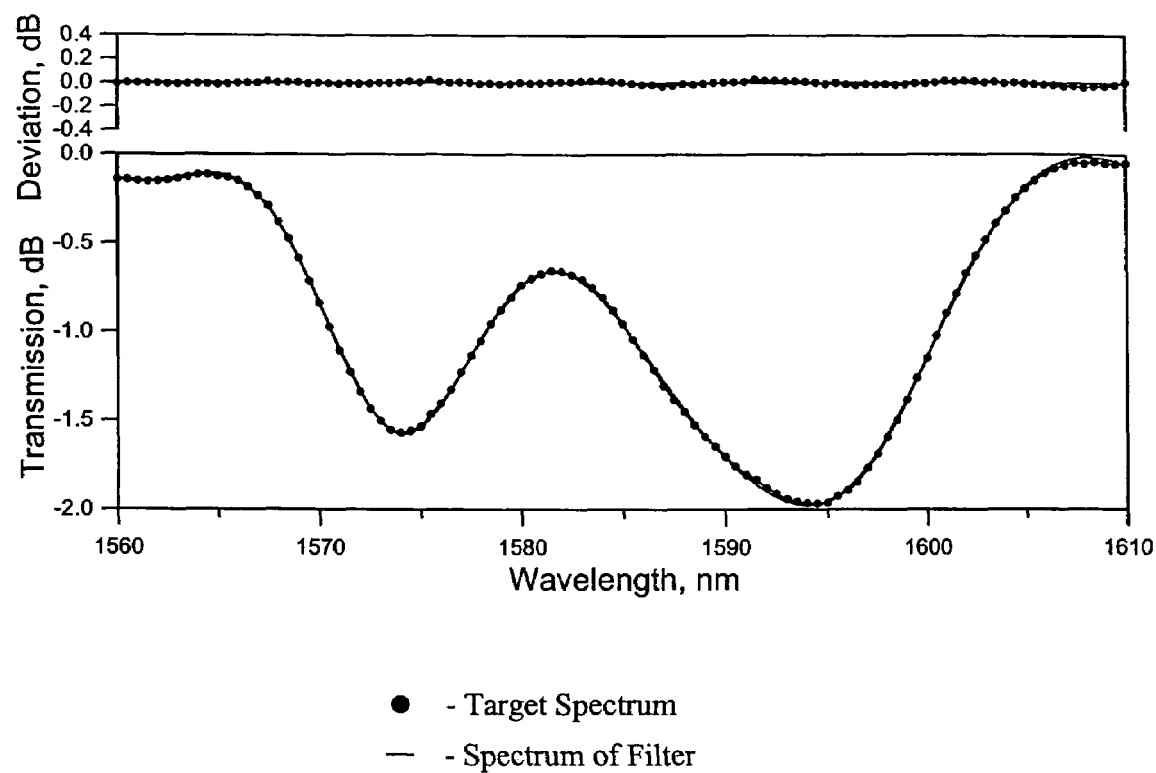
FIG. 9 illustrates a transmission spectrum of the gain flattening filter of the present invention depicted in FIG. 5.

A long period grating gain flattening filter in accordance with the present invention was formed in a single mode optical fiber having a photosensitive core by exposing an section of optical fiber to a square wave pattern using UV light from a CW frequency doubled argon-ion laser running at a 50 percent duty cycle. In this example, the filter consisted of five gratings sections with each grating section having a period of 267 microns. The lengths of the five sections were 15, 66, 21, 8, and 11 periods, respectively. The intervals between adjacent sections of the gain flattening filter of Example 2 were 1.62, 1.32, 1.39, and 1.63 periods. The total length of the gain flattening filter was approximately 33 millimeters. In this example, the optical lengths of the intervals between adjacent gratings were trimmed by exposure to ultraviolet light using the method set forth above. The resulting spectrum of the gain flattening filter of Example 2 is illustrated in FIG. 9. As can be seen from FIG. 9, the spectrum of the filter manufactured and tuned in accordance with methods set forth in the discussion of FIGS. 6 and 7 above was within plus/minus 0.05 dB of the target spectrum.

The gain flattening filter of the present invention incorporating long period gratings that are capable of being fine tuned to match a desired target spectrum may be manufactured using the methods described herein. The filter will be completed with a better match to the desired spectrum and with reduced costs than with prior methods. One advantage of the methods of the present invention is that the long period gratings may be manufactured using methods well known in the art to form gratings within the core of a photosensitive fiber. The methods are particularly advantageous in that they allow for fine tuning of the long period gratings after they are formed in the photosensitive core of an optical fiber to correct for any phase shifts inaccuracies that may have occurred during manufacturing. The methods are particularly advantageous in that, using the calculations set forth, a gain flattening filter may be designed having a spectrum that is very close to a desired target spectrum. Using the methods of the present invention to fine tune the spectrum of the gain flattening filter allows for a degree of matching of filter and target spectrums that has heretofore been unavailable.

The gain flattening filters and the methods of this invention are especially well-suited for manufacturing gain flattening filters in optical fibers or optical waveguides for use in telecommunication networks. The gain flattening filters and methods of this invention use currently known manufacturing techniques and do not require special set-up or processing such as is required in long period gratings utilizing varying period or varying refractive index, as set forth in the prior art.

While several specific embodiments of this invention have been illustrated and described, it will be apparent that various modifications can be made without the departing from the spirit and scope of the invention. Accordingly, it is not intended that the invention be limited, except as by the appended claims.

We claim:

1. A method of forming a gain flattening filter in an optical fiber, comprising:
   providing an optical fiber having a photosensitive core;
   providing a target spectrum to be matched by the gain flattening filter;
   determining the parameters of the gain flattening filter necessary to provide a spectrum to match the target spectrum;
   forming a plurality of gratings in the photosensitive core of the optical fiber in accordance with the determined parameters, each grating have the same spatial period, and each grating being separated from an adjacent grating by an interval having a length of less than ten spatial periods;
   analyzing the spectrum to determine if it matches the target spectrum within a selected range, and, if the spectrum does not match the target spectrum with the selected range, determining at least one interval to be illuminated with ultraviolet light to alter an optical length of the determined at least one interval, and exposing the determined at least one interval to ultraviolet light to alter the optical length of the at least one interval.

2. The method of claim 1, wherein exposing the determined at least one interval to ultraviolet light alters the optical length of the determined at least one interval by altering the refractive index of the core of the optical fiber in the area of the determined at least one interval.

3. The method of claim 1, further comprising monitoring the spectrum during exposing the determined at least one interval to ultraviolet light.

4. A method of forming a gain flattening filter capable of coupling light energy between co-propagating modes of transmitted light in an optical fiber, comprising:
   providing an optical fiber having a photosensitive core;
   providing a target spectrum to be matched by the gain flattening filter;
   determining the parameters of the gain flattening filter necessary to provide a spectrum to match the target spectrum;
   forming a plurality of gratings in the photosensitive core of the optical fiber in accordance with the determined parameters and each grating separated from an adjacent grating by an interval having a length of less than ten periods;
   analyzing the spectrum of the filter after forming the plurality of gratings to determine whether the spectrum of the filter matches the target spectrum within a selected range;
   determining, if the spectrum of the filter does not match the target spectrum within a selected range, at least one parameter to be used in adjusting the optical length of at least one of the intervals to fine tune the spectrum; and
   illuminating the at least one interval with ultraviolet light in accordance with the determined at least one parameter to alter the optical length of the at least one interval.

5. The method of claim 4, further comprising monitoring the adjusted spectrum of the filter while exposing the at least one interval to determine if the adjusted spectrum matches the target spectrum within the selected range.

* * * * *